(12) United States Patent
Xie et al.

(10) Patent No.: US 11,722,887 B2
(45) Date of Patent: Aug. 8, 2023

(54) PRIVACY PROTECTION AUTHENTICATION METHOD BASED ON WIRELESS BODY AREA NETWORK

(71) Applicant: HANGZHOU NORMAL UNIVERSITY, Hangzhou (CN)

(72) Inventors: Qi Xie, Hangzhou (CN); Xiumei Li, Hangzhou (CN); Dongnan Liu, Hangzhou (CN); Zixuan Ding, Hangzhou (CN); Bin Hu, Hangzhou (CN); Xiao Tan, Hangzhou (CN); Lidong Han, Hangzhou (CN)

(73) Assignee: HANGZHOU NORMAL UNIVERSITY, Hangzhou (CN)

( * ) Notice: Subject to any disclaimer, the term of this patent is extended or adjusted under 35 U.S.C. 154(b) by 0 days.

(21) Appl. No.: 17/893,170

(22) Filed: Aug. 23, 2022

(65) Prior Publication Data
US 2023/0075612 A1 Mar. 9, 2023

(30) Foreign Application Priority Data

Sep. 7, 2021 (CN) .......................... 202111043102.8

(51) Int. Cl.
*H04L 9/32* (2006.01)
*H04W 12/02* (2009.01)
*H04L 9/40* (2022.01)
*H04W 84/18* (2009.01)
*H04L 9/08* (2006.01)

(52) U.S. Cl.
CPC ......... *H04W 12/02* (2013.01); *H04L 63/0869* (2013.01); *H04W 84/18* (2013.01)

(58) Field of Classification Search
CPC .... H04W 12/02; H04W 84/18; H04L 63/0869
USPC .......................................................... 380/27
See application file for complete search history.

(56) References Cited

U.S. PATENT DOCUMENTS

| 9,801,542 | B2 * | 10/2017 | Tran ....................... G16H 40/67 |
| 10,498,715 | B2 * | 12/2019 | Pogorelik ............. H04W 12/33 |
| 11,405,789 | B1 * | 8/2022 | Wei ........................ H04W 60/00 |

(Continued)

FOREIGN PATENT DOCUMENTS

CN 112152807 A * 12/2020 ........... H04L 9/0838

*Primary Examiner* — Haresh N Patel
(74) *Attorney, Agent, or Firm* — Zhigang Ma

(57) ABSTRACT

A privacy protection authentication method based on a wireless body area network may be applied to a smart home care system. The method provides an authentication method for two-way authentication and key verification between a device and a cloud server, can ensure identities of the device and the cloud server to be valid and prevent network information security from being affected by external invasion attacks. A physical unclonable function and an elliptic curve cryptography algorithm are introduced to encrypt key data in the authentication process, so that the whole authentication process is in a safe environment, and the security of the authentication process is further improved through adding and removing functions of a third-party identity. The privacy protection authentication protocol method can resist replay attacks and smart card impersonation attacks, the whole authentication process is safe and efficient, and has a high application value in smart home care scenes.

8 Claims, 2 Drawing Sheets

(56) References Cited

U.S. PATENT DOCUMENTS

| | | | |
|---|---|---|---|
| 2011/0122858 A1* | 5/2011 | Yashiro | H04L 67/12 |
| | | | 370/338 |
| 2019/0205810 A1* | 7/2019 | Pojar | H04L 67/306 |
| 2019/0373137 A1* | 12/2019 | Krukar | H04N 1/444 |
| 2021/0105615 A1* | 4/2021 | Marsden | H04W 12/041 |
| 2022/0070666 A1* | 3/2022 | Hua | H04L 9/3213 |

* cited by examiner

PRIVACY PROTECTION AUTHENTICATION METHOD BASED ON WIRELESS BODY AREA NETWORK

TECHNICAL FIELD

The invention relates to the field of information security technologies, in particularly to a privacy protection authentication method based on a wireless body area network (WBAN).

BACKGROUND

Data transmission in wireless body area networks can submit data captured by smart sensor devices to cloud-based server platforms in real time, and ultimately to medical professionals, which can realize real-time healthcare monitoring, emergency healthcare response systems, smart home care systems, etc., to help patients enjoy high-quality healthcare services.

In order to improve the security of system, participating entities in a system need an authenticated session key agreement, however, when a sensor device transmits private health data to a cloud-based server platform, it needs to pass through a public channel, which requires that the security of the data must be considered in the process of information transmission.

Because of mobility and openness of wireless body area networks, one of hot issues in the research field is how to protect sensitive data of patients.

The dependence on wireless technology brings many security challenges to existing protocol schemes, such as replay attacks and smart card theft attacks to obtain information of patients.

The patent document of Chinese patent application publication No. CN104901809A discloses a remote authentication protocol method based on password and smart card. The method employs an optimized elliptical curve algorithm, and a counting set and authentication codes are embedded. The password can be modified, and a lost smart card can be canceled. However, the protocol has no extra protection for verification parameters, and the parameters may be intercepted in the public channel, and thus the security is not high.

The patent document of Chinese patent application publication No. CN111294352A discloses a data security authentication method between a cloud and an edge node. An elliptic curve cryptographic algorithm is introduced to encrypt key data in an authentication process. An algorithm key size, system parameters and a storage space are relatively small, and thus the method is suitable for an authentication environment of edge computing nodes with limited computing resources and storage resources. However, the method does not optimize the algorithm, and does not consider the problem of replay attacks, making the security is not high.

The academic document entitled "A provably secure and lightweight patient-healthcare authentication protocol in wireless body area networks" proposed by Bander A. Alzahrani et al. in "Wireless Personal Communications" on Mar. 29, 2020 discloses an authenticated patient-healthcare monitoring protocol is proposed, which uses untraceable temporal credentials for wireless sensor networks (WSNs) to complete mutual authentication through two-factor authenticated key agreement protocol, but it is vulnerable to threats of session-specific temporary information attacks and replay attacks.

SUMMARY

In view of the problems in the related art, a purpose of the invention is to provide a privacy protection authentication method based on wireless body area networks. The method may be applied to an intelligent home care system, and encrypts key data in an authentication process by employing the Deffie-Hellman key exchange and introducing a physical unclonable function (PUF) and an elliptic curve cryptographic algorithm, to resist replay attacks, smart card theft attacks, sensor capture attacks and other issues, thereby improving the security of information transmission.

Specifically, a privacy protection authentication method based on a wireless body area network, may be applied to an intelligent home care system and may include:

S1, initializing a cloud server HN;

S2, submitting a registration request in a secure channel to a super administrator SA by a user through a device, and returning registration information to the device through the secure channel by the super administrator after computational processing;

S3, submitting an authentication request to the cloud server HN, accessing the registration information from a memory and sending the registration information after being added with verification parameters to the cloud server HN, by the user through the device;

S4, determining a session key $K_{SH}$ for the device and the cloud server HN, after the device and the cloud server HN both complete authentications; and S5, updating the registration information in the memory.

In a preferred embodiment, the initializing a cloud server HN specifically includes: selecting a function of an elliptic curve $E_p$ and a base point P on the elliptic curve $E_p$ by the super administrator SA, then determining a long-term key $K_{CHN}$ and secretly storing the long-term key $K_{CHN}$ in the cloud server HN by the super administrator SA, calculating a public key $Q=K_{CHN} \cdot P$ of the cloud server HN through the function of the elliptic curve $E_p$, and making parameters except the long-term key $K_{CHN}$ public.

In a preferred embodiment, the device and the cloud server HN transmit information EMS through a wireless public channel, the information EMS is relayed through a router AP, the router AP is responsible for relaying and forwarding the information EMS, and an identity $id_p$ of the router AP is added to or removed from the relayed information EMS.

In a preferred embodiment, the S2 specifically includes:

S2.1, transmitting information with the super administrator SA through the secure channel by the user after installing a healthcare monitoring device;

S2.2, sending the registration request to the super administrator SA through the secure channel by the user;

S2.3, generating current time stamp $T_j$ and storing the current time stamp $T_j$ in the cloud server HN, by the super administrator SA after receiving the registration request; setting an identity $id_j$ and a random integer $a_j$ for a sensor node SN of the healthcare monitoring device by the super administrator SA, calculating public values $x_j$ and $y_j$ between the cloud server HN and the sensor node SN of the healthcare monitoring device and a secret value $MN_j$ between the cloud server HN and the sensor node SN of the healthcare monitoring device, and sending the registration information to the sensor node SN of the healthcare monitoring device through the secure channel;

S2.4, storing the registration information $\{id_j, x_j, y_j, MN_j\}$ to the memory by the sensor node SN of the healthcare monitoring device after receiving the registration information;

S2.5, setting an identity $id_p$ for a router AP by the super administrator SA, and storing the identity $id_p$ in both the router AP and the cloud server HN; and S2.6, generating a device challenge value $Cha_j$ based on a physical unclonable function (PUF), calculating a response value $Res_j$, calculating a secret value $ST_j$ of the sensor node SN and storing $Cha_j$, $Res_j$, $ST_j$ in the memory, by the sensor node SN of the healthcare monitoring device.

In a preferred embodiment, the authentications in the S4 are based on mutual authentication and key verification between a sensor node SN of a healthcare monitoring device and the cloud server HN.

In a preferred embodiment, specific steps of the mutual authentication and key verification include:

S4.1, generating current time stamp $T_1$, obtaining an identity verification parameter $Vid_j$ through encrypted computation and sending information $EMS_1$ to a router AP, by the sensor node SN of the healthcare monitoring device;

S4.2, adding, by the router AP after receiving the information $EMS_1$, an identity $id_p$ into the information $EMS_1$ to obtain information $EMS_2$, and sending the information $EMS_2$ carrying the identity $id_p$ of the router AP to the cloud server HN by the router AP;

S4.3, generating current time stamp $T_2$ and judging the time stamp $T_1$ and the identity $id_p$ in the information $EMS_2$ by the cloud server HN; when any one of the time stamp $T_1$ and the identity $id_p$ is judged to be invalid, terminating a first authentication; when the time stamp $T_1$ and the identity $id_p$ both are judged to be valid, acquiring by the cloud server HN a time stamp $T_j$ and a long-term key $K_{CHN}$ from a database, performing computation on the time stamp $T_j$ and the long-term key $K_{CHN}$ together with parameters in the information $EMS_2$ to obtain an identity comparison verification parameter $Vid_j^*$ and comparing the identity comparison verification parameter $Vid_j^*$ with the identity verification parameter $Vid_j$ in the information $EMS_2$ to obtain a comparison result, terminating the first authentication when the comparison result indicates they are not equal, the first authentication being successful when the comparison result indicates they are equal;

S4.4, generating a session key $K_{SH}$ by the cloud server HN after the first authentication is successful, and sending information $EMS_3$ to the router AP after obtaining an identity verification parameter $\Delta$ through computation;

S4.5, removing the identity $id_p$ by the router AP after receiving the information $EMS_3$ to obtain information $EMS_4$, and then sending the information $EMS_4$ to the sensor node SN of the healthcare monitoring device;

S4.6, generating current time stamp $T_3$ and judging a time stamp $T_2$ in the information $EMS_4$ by the sensor node SN of the healthcare monitoring device; when the time stamp $T_2$ is judged to be invalid, terminating a second authentication; when the time stamp $T_2$ is judged to be valid, obtaining an identity $id_j$ from the sensor node SN by the sensor node SN of the healthcare monitoring device, performing computation on the identity $id_j$ together with parameters in the information $EMS_4$ to obtain an identity comparison verification parameter $\Delta^*$ and comparing the identity comparison verification parameter $\Delta^*$ with the identity verification parameter $\Delta$ in the information $EMS_4$ to obtain a second comparison result, terminating the second authentication when the second comparison result indicates they are not equal, the second authentication being successful when the second comparison result indicates they are equal; and S4.7, after the second authentication is successful, acquiring the session key $K_{SH}$ from the information $EMS_4$ by the sensor node SN of the healthcare monitoring device, and updating the registration information in the memory.

In a preferred embodiment, a method of time stamp judgement is $|T_n - T_{n+1}| \leq \Delta T$, where $T_n$ represents a time stamp contained in information sent from a previous stage, $T_{p+1}$ represents current time stamp obtained by a device when receiving the information sent from the previous stage, and $\Delta T$ represents a preset maximum delay time allowed in a communication process; when a time difference between $T_n$ and $T_{n+1}$ is greater than the threshold $\Delta T$, an authentication is terminated, and whereas when the time difference is less than the threshold $\Delta T$, going to a next step.

In a preferred embodiment, the S4.1 specifically includes: generating, by the sensor node SN of the healthcare monitoring device, a random number and the current time stamp $T_1$, calculating two verification parameters $S_1 = b_j \cdot P$ and $S_2 = b_j \cdot Q$ through a function of an elliptic curve $E_p$, calculating the identity verification parameter $Vid_j = h(id_j \| x_j \| y_j \| S_1 \| S_2 \| h(S_2, MH_j) \| T_j \| T_1)$, and adding $\{x_j, y_j, Vid_j, S_1, T_1, T_j\}$ into the information $EMS_1$, where $x_j$ and $y_j$ are acquired from the memory;

the S4.3 specifically includes: when the time stamp $T_1$ and the identity $id_p$ both are judged to be valid, calculating $a_j = x_j \oplus h(K_{HN}, T_j)$, $id_j^* = x_j \oplus h(K_{HN}, a_j, T_j)$ by the cloud server HN based on content of the information $EMS_2$, calculating $S_2^* = K_{HN} \cdot S_1$ through the function of the elliptic curve $E_p$, and then obtaining the identity comparison verification parameter $Vid_j^* = h(id_k^* \| x_j \| y_j \| S_1 \| S_2^* \| h(S_2^*, h(id_j^*, K_{HN})) \| T_j \| T_1)$ through computation;

the S4.4 specifically includes: generating two random numbers $a_i$ and $b_i$ by the cloud server HN, calculating two verification parameters $S_3 = b_i \cdot P$ and $S_4 = b_i \cdot S_1$ through the function of the elliptic curve $E_p$, updating $x_j^{new} = a_i \oplus h(K_{CHN} \| T_2)$ and $y_j^{new} = id_j^* \oplus h(K_{CHN} \| a_i \| T_2)$, calculating transfer values $\mu = x_j^{new} \oplus h(S_2^* \| h(id_j^* \| h(id_j^* \| K_{CHN}) \| T_2)$ and $\lambda = y_j^{new} \oplus h(T_2 \| S_2^* \| h(id_j^* \| K_{CHN}))$, calculating the session key $K_{SH}$, calculating the identity verification parameter $\Delta = h(x_j^{new} \| y_j^{new} \| K_{SH} \| T_2)$, and adding $\{\mu, \lambda, \Delta, S_3, T_2, id_p\}$ into the information $EMS_3$, where $\mu$ is configured to encrypt the $x_j^{new}$, and $\lambda$ is configured to encrypt the $y_j^{new}$;

the S4.6 specifically includes: when the time stamp $T_2$ is judged to be valid, calculating $S_4^* = b_j \cdot S_3$ through the function of the elliptic curve $E_p$ by the sensor node SN of the healthcare monitoring device, calculating updated $x_j^{new*} = \mu \oplus h(S_3 \| MH_j \| T_2)$ and updated $y_j^{new*} = \lambda \oplus h(T_2 \| S_2 \| MH_j)$, calculating a session key $K_{SH}^*$ based on content of the information $EMS_4$, and calculating the identity comparison verification parameter $\Delta^* = h(x_j^{new*} \| y_j^{new*} \| K_{SH}^* \| T_2)$;

identity verification parameter comparison is comparing an identity verification parameter carried by information EMS sent from a previous stage with an identity comparison verification parameter obtained by each of the sensor node SN of the health monitoring device and the cloud server HN based on existing parameters, the identity verification parameter carried by information EMS sent from a previous stage is one of $Vid_j = h(id_j \| x_j \| y_j \| S_1 \| S_2 \| h(S_2, MH_j) \| T_j \| T_1)$ of the sensor node SN of the healthcare monitoring device and $\Delta = h(x_j^{new} \| y_j^{new} \| K_{SH} \| T_2)$ of the cloud server HN, the identity comparison verification parameter obtained by each of the sensor node SN of the health monitoring device and the cloud server HN based on existing parameters is one of $Vid_j^*=h(id_j^*\|x_j\|y_j\|S_1\|S_2^*\|h(S_2^*, h(id_j^*, K_{HN}))\|T_j\|T_1)$ of the cloud server HN and $\Delta^*=h(x_j^{new*}\|y_j^{new*}\|K_{SH}^*\|T_2)$ of the sensor node SN of the healthcare monitoring device.

In a preferred embodiment, the updating the registration information specifically includes: after the device and the cloud server HN complete mutual authentication and key verification, acquiring, by the device, parameters from information $EMS_4$ sent by the cloud server HN, calculating $x_j^{new*}=\mu\oplus h(S_3\|MH_j\|T_2)$ and $y_j^{new*}=\lambda\oplus h(T_2\|S_2\|MH_j)$, using $x_j^{new*}$ to replace $x_j$ of the registration information in the memory, and using $y_j^{new*}$ to replace $y_j$ of the registration information in the memory.

The above parameters with the symbol "*" are information may be stolen or impersonated by the third party in the authentication processes.

Compared with the related art, the embodiments of the invention may achieve beneficial effects as follows.

The key data in the authentication processes are encrypted by using Deffie-Hellman key exchange and introducing a physical unclonable function and an elliptic curve cryptographic algorithm, the registration information are encrypted by introducing a time stamp T in the registration process, and moreover, the time stamp T is updated in time after the authentications are completed, so that the registration information is difficult to be stolen, and the threats of replay attacks and smart card impersonation attacks are solved.

In addition, by setting the third-party router AP as a relay station between the sensor node SN and the server HN, the function of adding and removing the independent identity $id_p$ is provided in the information transmission process, and thus the privacy of the transmission process is improved.

DETAILED DESCRIPTION OF EMBODIMENTS

Embodiments of the invention will be described in detail below in conjunction with the accompanying drawings.

Figure 1:
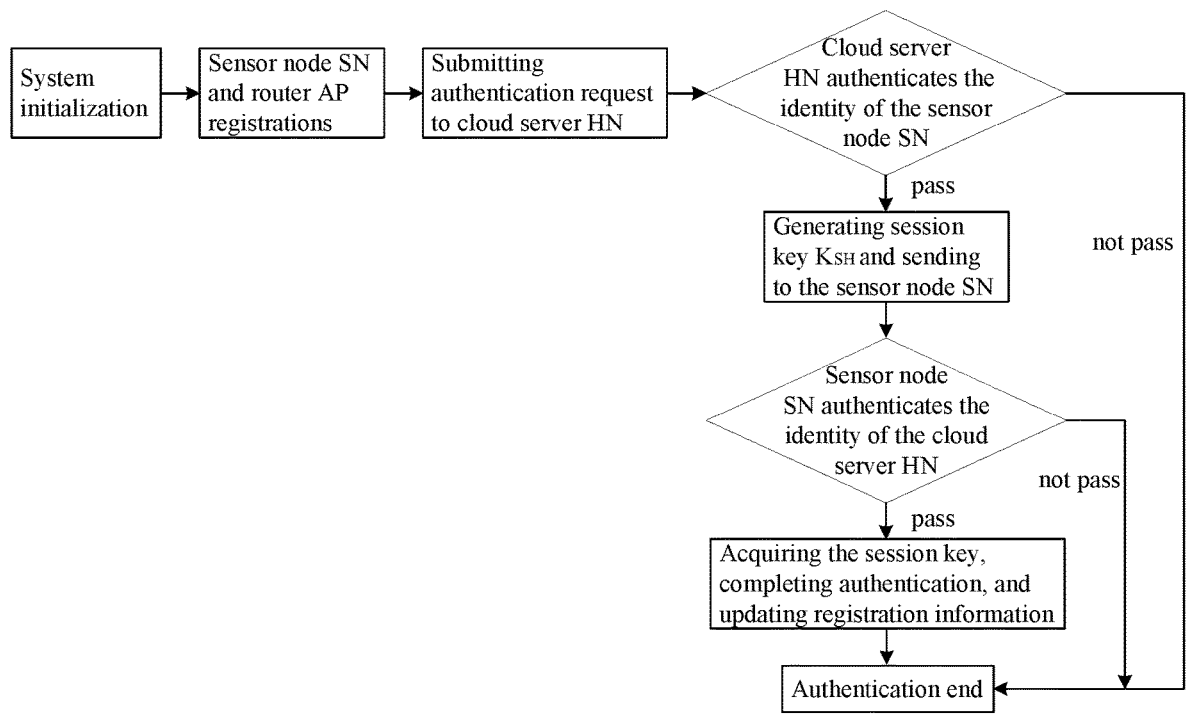
FIG. 1 illustrates a schematic flowchart of a privacy protection authentication method based on wireless body area networks according to an embodiment of the invention.

As illustrated in FIG. 1, a privacy protection authentication method based on a wireless body area network (WBAN) is provided. The privacy protection authentication method may be applied to a smart home care system (also referred to as smart elderly care system) and may include steps S1~S5 as follows.

S1, initializing a cloud server HN. Herein, HN is the abbreviation of "Hub Node" and thus "cloud server HN" may also be referred to as "cloud server hub node".

S2, submitting a registration request in a secure channel to a super administrator SA by a user through a device, returning registration information to the device of the user through the secure channel by the super administrator SA after computational processing, and storing the registration information in a memory.

S3, submitting an authentication request to the cloud server HN, accessing the registration information from the memory and sending the registration information after being added with verification parameters to the cloud server HN, by the user through the device.

S4, performing authentications by both the device and the cloud server HN, thereby determining a session key $K_{SH}$ for the device and the cloud server HN.

S5, updating the registration information in the memory.

The initializing a cloud server HN may include: selecting a function of an elliptic curve $E_p$ and a base point P on the elliptic curve $E_p$ by the super administrator SA, then determining a long-term key $K_{CHN}$ and secretly storing the long-term key $K_{CHN}$ in the cloud server HN by the super administrator SA, calculating a public key $Q=K_{CHN}\cdot P$ of the cloud server HN through the function of the elliptic curve $E_p$, and making above parameters except the long-term key $K_{CHN}$ public.

In some embodiments, the S2 specifically includes S2.1~S2.6 as follows.

S2.1, transmitting information with the cloud server HN through a router AP by the user after installing a healthcare monitoring device. Herein, AP is the abbreviation of "Access Point".

S2.2, sending the registration request to the super administrator SA through the secure channel by the user.

S2.3, generating current time stamp $T_j$ and storing the current time stamp $T_j$ in the cloud server HN, by the super administrator SA after receiving the registration request; setting an identity $id_j$ and a random integer $a_j$ for a sensor node SN of the healthcare monitoring device by the super administrator SA, calculating $x_j=a_j\oplus h(K_{CHN}, T_j)$ used for hiding the random integer $a_j$, calculating $y_j=id_j\oplus h(K_{CHN}, a_j, T_j)$ used for hiding the identity $id_j$, calculating a secret value $MN_j=h(id_j, K_{CHN})$ between the cloud server HN and the sensor node SN of the healthcare monitoring device, and sending the registration information to the sensor node SN of the healthcare monitoring device through the router AP.

S2.4, storing the registration information $\{id_j, x_j, y_j, MN_j\}$ into the memory by the sensor node SN of the healthcare monitoring device after receiving the registration information.

S2.5, setting an identity $id_p$ for the router AP by the super administrator SA, and storing the identity $id_p$ in both the router AP and the cloud server HN.

S2.6, generating a device challenge value $Cha_j$ based on a physical unclonable function (PUF), calculating a response value $Res_j$, calculating a secret value $ST_j$ of the sensor node SN and storing $Cha_j$, $Res_j$, $ST_j$ in the memory, by the sensor node SN of the healthcare monitoring device.

Figure 2:
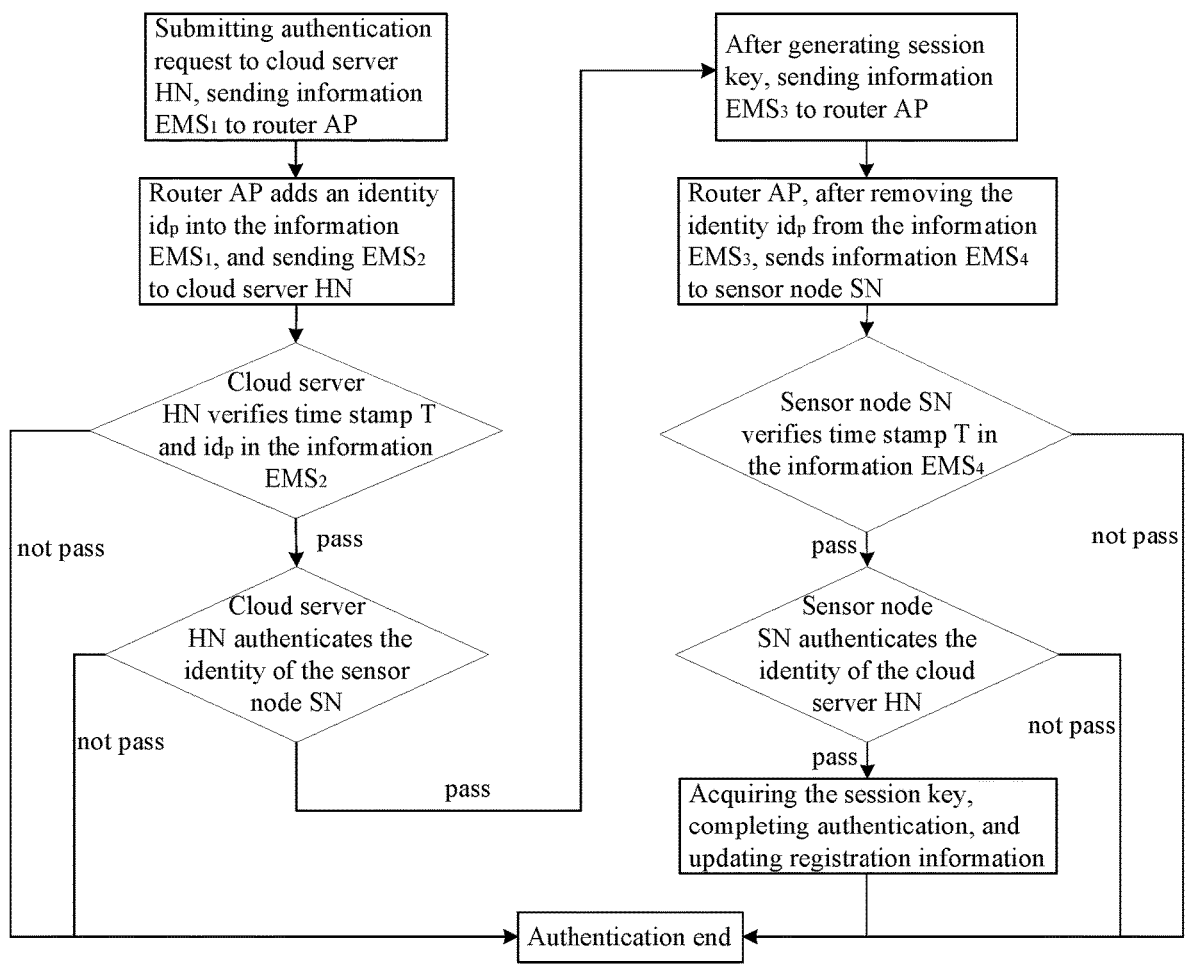
FIG. 2 illustrates a schematic flowchart associated with mutual authentication and key verification between a sensor node SN of a healthcare monitoring device and a cloud server HN according to an embodiment of the invention.

As illustrated in FIG. 2, a schematic flowchart associated with mutual authentication (also referred to as two-way authentication) and key verification between the sensor node SN of the healthcare monitoring device and the cloud server HN is shown. Specific steps S4.1~S4.7 are carried out as follows.

S4.1, generating a random number $b_j$ and current time stamp $T_1$ by the sensor node SN of the healthcare monitoring device, calculating two verification parameters $S_1=b_j\cdot P$ and $S_2=b_j\cdot Q$ through the function of the elliptic curve $E_p$, calculating an identity verification parameter $Vid_j=h(id_j\|x_j\|y_j\|S_1\|S_2\|h(S_2, MH_j)\|T_j\|T_1)$, and sending $EMS_1\{x_j, y_j, Vid_j, S_1, T_1, T_j\}$ to the router AP.

S4.2, adding, by the router AP after receiving the information $EMS_1$, the identity $id_p$ into the information EMS, to obtain information $EMS_2\{x_j, y_j, Vid_j, S_1, T_1, T_j, id_p\}$, and sending the information $EMS_2$ carrying the identity $id_p$ to the cloud server HN by the router AP.

S4.3, generating current time stamp $T_2$ and judging the time stamp $T_1$ and the identity $id_p$ in the information $EMS_2$ by the cloud server HN after receiving the information $EMS_2$; when any one of the time stamp $T_1$ and the identity $id_p$ is judged to be invalid, terminating the authentication;

Whereas, when both of them are passed, i.e., the time stamp $T_1$ and the identity $id_p$ both are judged to be valid, acquiring by the cloud server HN the time stamp $T_j$ and the long-term key $K_{CHN}$ from a database, calculating $a_j=x_j\oplus h(K_{HN}, T_j)$, $id_j*=x_j\oplus h(K_{HN}, a_j, T_j)$ by the cloud server HN based on content of the information $EMS_2$, calculating $S_2*=K_{HN}\cdot S_1$ through the function of the elliptic curve $E_p$, and then calculating an identity comparison verification parameter $Vid_j*=h(id_j*\|x_j\|y_j\|S_1\|S_2\|h(S_2*, K_{HN}))\|T_j\|T_1)$, and comparing the identity comparison verification parameter $Vid_j*$ with the identity verification parameter $Vid_j$ in the information $EMS_2$; terminating the authentication when the comparison result indicates they are not equal, or the authentication being successful when the comparison result indicates they are equal.

S4.4, generating two random numbers $a_i$ and $b_i$ by the cloud server HN after successfully authenticating the sensor node SN, calculating two verification parameters $S_3=b_i\cdot P$ and $S_4=b_i\cdot S_1$ through the function of the elliptic curve $E_p$, updating $x_j^{new}=a_i\oplus h(K_{CHN}\|T_2)$ and $y_k^{new}=id_j*\oplus h(K_{CHN}\|a_i\|T_2)$, calculating transfer values $\mu=x_j^{new}\oplus h(S_2*\|h(id_j*\|K_{CHN})\|T_2)$, $\lambda=y_j^{new}\oplus h(T_2\|S_2\|h(id_j*\|K_{CHN}))$ and a session key $K_{SH}=h(S_1, S_2, S_3, S_4, id_j*, T_2)$, calculating an identity verification parameter $\Delta=h(x_j^{new}\|y_j^{new}\|K_{SH}\|T_2)$, and sending $EMS_3\{\mu, \lambda, \Delta, S_3, T_2, id_p\}$ to the router AP. Herein, $\mu$ is configured (i.e., structured and arranged) to encrypt the $x_j^{new}$, and $\lambda$ is configured to encrypt the $y_j^{new}$.

S4.5, removing the identity $id_p$ by the router AP after receiving the information $EMS_3$ to obtain information $EMS_4\{\mu, \lambda, \Delta, S_3, T_2\}$, and then sending the information $EMS_4\{\mu, \lambda, \Delta, S_3, T_2\}$ to the sensor node SN of the healthcare monitoring device.

S4.6, judging the time stamp $T_2$ in the information $EMS_4$ by the sensor node SN of the healthcare monitoring device after receiving the information $EMS_4$, and when the time stamp $T_2$ is judged to be invalid, terminating the authentication;

Whereas, when it is passed (i.e., the time stamp $T_2$ is judged to be valid), calculating $S_4*=b_j\cdot S_3$ through the function of the elliptic curve $E_p$ by the sensor node SN of the healthcare monitoring device, calculating updated $x_j^{new}*=\mu\oplus h(S_3\|MH_j\|T_2)$ and updated $y_j^{new}*=\lambda\oplus h(T_2\|S_2\|MH_j)$, calculating $K_{SH}*=h(S_1\|S_2\|S_3\|S_4*\|id_j\|T_2)$ based on content of the information $EMS_4$, calculating an identity comparison verification parameter $\Delta*=h(x_j^{new}*\|y_j^{new}*\|K_{SH}\|T_2)$, and comparing the identity comparison verification parameter $\Delta*$ with the identity verification parameter $\Delta$ in the information $EMS_4$; terminating the authentication when the comparison result indicates they are not equal, or the authentication being successful when the comparison result indicates they are equal.

S4.7, after the authentication is passed (i.e., the sensor node SN successfully authenticates the cloud server HN), acquiring the session key $K_{SH}*=h(S_1\|S_2\|S_3\|S_4*\|id_j\|T_2)$ from the information $EMS_4$ by the sensor node SN of the healthcare monitoring device, using $x_j^{new}*$ to replace $x_j$ of the registration information in the memory, and using $y_j^{new}*$ to replace $y_j$ of the registration information in the memory.

A method for time stamp judgement may be that $\|T_n-T_{n+1}\|\leq\Delta T$, where $T_n$ is the time stamp contained in the information sent from a previous stage, $T_{n+1}$ is the current time stamp obtained by a device when receiving the information, and $\Delta T$ is a preset maximum delay time allowed in a communication process. When the time difference between $T_n$ and $T_{n+1}$ is greater than the threshold $\Delta T$, the authentication is terminated, and whereas when the time difference is less than the threshold $\Delta T$, going to the next step.

The above parameters with the symbol "*" are information may be stolen or impersonated by the third party in the authentication processes.

What is claimed is:

1. A privacy protection authentication method based on a wireless body area network, comprising:
   S1, initializing a cloud server HN;
   S2, submitting a registration request in a secure channel to a super administrator SA by a user through a device, and returning registration information to the device through the secure channel by the super administrator after computational processing;
   S3, submitting an authentication request to the cloud server HN, accessing the registration information from a memory and sending the registration information after being added with verification parameters to the cloud server HN, by the user through the device;
   S4, determining a session key $K_{SH}$ for the device and the cloud server HN, after the device and the cloud server HN both complete authentications; and
   S5, updating the registration information in the memory;
   wherein the device and the cloud server HN transmit information EMS through a wireless public channel, the information EMS is relayed through a router AP, the router AP is responsible for relaying and forwarding the information EMS, and an identity $id_p$ of the router AP is added to or removed from the relayed information EMS; and
   wherein the S2 specifically comprises:
   S2.1, transmitting information with the super administrator SA through the secure channel by the user after installing a healthcare monitoring device;
   S2.2, sending the registration request to the super administrator SA through the secure channel by the user;
   S2.3, generating current time stamp $T_j$ and storing the current time stamp $T_j$ in the cloud server HN, by the super administrator SA after receiving the registration request; setting an identity $id_j$ and a random integer $a_j$ for a sensor node SN of the healthcare monitoring device by the super administrator SA, calculating public values $x_j$ and $y_j$ between the cloud server HN and the sensor node SN of the healthcare monitoring device and a secret value $MN_j$ between the cloud server HN and the sensor node SN of the healthcare monitoring device, and sending the registration information to the sensor node SN of the healthcare monitoring device through the secure channel;
   S2.4, storing the registration information $\{id_j, x_j, y_j, MN_j\}$ to the memory by the sensor node SN of the healthcare monitoring device after receiving the registration information;
   S2.5, setting an identity $id_p$ for a router AP by the super administrator SA, and storing the identity $id_p$ in both the router AP and the cloud server HN; and
   S2.6, generating a device challenge value $Cha_j$ based on a physical unclonable function (PUF), calculating a response value $Res_j$, calculating a secret value $ST_j$ of the sensor node SN and storing $Cha_j$, $Res_j$, $ST_j$ in the memory, by the sensor node SN of the healthcare monitoring device.

2. The privacy protection authentication method as claimed in claim 1, wherein the initializing a cloud server HN specifically comprises:
   selecting a function of an elliptic curve $E_p$ and a base point P on the elliptic curve $E_p$ by the super administrator SA, then determining a long-term key $K_{CHN}$ and secretly storing the long-term key $K_{CHN}$ in the cloud server HN by the super administrator SA, calculating a public key $Q=K_{CHN} \cdot P$ of the cloud server HN through the function of the elliptic curve $E_p$, and making parameters except the long-term key $K_{CHN}$ public.

3. The privacy protection authentication method as claimed in claim 1, wherein the authentications in the S4 are based on mutual authentication and key verification between a sensor node SN of a healthcare monitoring device and the cloud server HN.

4. The privacy protection authentication method as claimed in claim 3, wherein specific steps of the mutual authentication and key verification comprise:

S4.1, generating current time stamp $T_1$, obtaining an identity verification parameter $Vid_j$ through encrypted computation and sending information $EMS_1$ to a router AP, by the sensor node SN of the healthcare monitoring device;

S4.2, adding, by the router AP after receiving the information $EMS_1$, an identity $id_p$ into the information $EMS_1$ to obtain information $EMS_2$, and sending the information $EMS_2$ carrying the identity $id_p$ of the router AP to the cloud server HN by the router AP;

S4.3, generating current time stamp $T_2$ and judging the time stamp $T_1$ and the identity $id_p$ in the information $EMS_2$ by the cloud server HN; when any one of the time stamp $T_1$ and the identity $id_p$ is judged to be invalid, terminating a first authentication; when the time stamp $T_1$ and the identity $id_p$ both are judged to be valid, acquiring by the cloud server HN a time stamp $T_j$ and a long-term key $K_{CHN}$ from a database, performing computation on the time stamp $T_j$ and the long-term key $K_{CHN}$ together with parameters in the information $EMS_2$ to obtain an identity comparison verification parameter $Vid_j^*$ and comparing the identity comparison verification parameter $Vid_j^*$ with the identity verification parameter $Vid_j$ in the information $EMS_2$ to obtain a comparison result, terminating the first authentication when the comparison result indicates they are not equal, the first authentication being successful when the comparison result indicates they are equal;

S4.4, generating a session key $K_{SH}$ by the cloud server HN after the first authentication is successful, and sending information $EMS_3$ to the router AP after obtaining an identity verification parameter $\Delta$ through computation;

S4.5, removing the identity $id_p$ by the router AP after receiving the information $EMS_3$ to obtain information $EMS_4$, and then sending the information $EMS_4$ to the sensor node SN of the healthcare monitoring device;

S4.6, generating current time stamp $T_3$ and judging a time stamp $T_2$ in the information $EMS_4$ by the sensor node SN of the healthcare monitoring device; when the time stamp $T_2$ is judged to be invalid, terminating a second authentication; when the time stamp $T_2$ is judged to be valid, obtaining an identity $id_j$ from the sensor node SN by the sensor node SN of the healthcare monitoring device, performing computation on the identity $id_j$ together with parameters in the information $EMS_4$ to obtain an identity comparison verification parameter $\Delta^*$ and comparing the identity comparison verification parameter $\Delta^*$ with the identity verification parameter $\Delta$ in the information $EMS_4$ to obtain a second comparison result, terminating the second authentication when the second comparison result indicates they are not equal, the second authentication being successful when the second comparison result indicates they are equal; and S4.7, after the second authentication is successful, acquiring the session key $K_{SH}$ from the information $EMS_4$ by the sensor node SN of the healthcare monitoring device, and updating the registration information in the memory.

5. The privacy protection authentication method as claimed in claim 4, wherein a method of time stamp judgement is $|T_n - T_{n+1}| \leq \Delta T$, where $T_n$ represents a time stamp contained in information sent from a previous stage, $T_{n+1}$ represents current time stamp obtained by a device when receiving the information sent from the previous stage, and $\Delta T$ represents a preset maximum delay time allowed in a communication process; when a time difference between $T_n$ and $T_{n+1}$ is greater than the threshold $\Delta T$, an authentication is terminated, and whereas when the time difference is less than the threshold $\Delta T$, going to a next step.

6. The privacy protection authentication method as claimed in claim 4, wherein the S4.1 specifically comprises:

generating, by the sensor node SN of the healthcare monitoring device, a random number $b_j$ and the current time stamp $T_1$, calculating two verification parameters $S_1 = b_j \cdot P$ and $S_2 = b_j \cdot Q$ through a function of an elliptic curve $E_p$, calculating the identity verification parameter $Vid_j = h(id_j \| x_j \| y_j \| S_1 \| S_2 \| h(S_2, MH_j) \| T_j \| T_1)$, and adding $\{x_j, y_j, Vid_j, S_1, T_1, T_j\}$ into the information $EMS_1$, where $x_j$ and $y_j$ are acquired from the memory;

wherein the S4.3 specifically comprises:

when the time stamp $T_1$ and the identity $id_p$ both are judged to be valid, calculating $a_j = x_j \oplus h(K_{HN}, T_j)$, $id_j^* = x_j \oplus h(K_{HN}, a_j, T_j)$ by the cloud server HN based on content of the information $EMS_2$, calculating $S_2^* = K_{HN} \cdot S_1$ through the function of the elliptic curve $E_p$, and then obtaining the identity comparison verification parameter $Vid_j^* = h(id_j^* \| x_j \| y_j \| S_1 \| S_2^* \| h(S_2^*, h(id_j^*, K_{HN})) \| T_j \| T_1)$ through computation;

wherein the S4.4 specifically comprises:

generating two random numbers $a_i$ and $b_i$ by the cloud server HN, calculating two verification parameters $S_3 = b_i \cdot P$ and $S_4 = b_i \cdot S_1$ through the function of the elliptic curve $E_p$, updating $x_j^{new} = a_i \oplus h(K_{CHN} \| T_2)$ and $y_j^{new} = id_j^* \oplus h(K_{CHN} \| a_i \| T_2)$, calculating transfer values $\mu = x_j^{new} \oplus h(S_2^* \| h(id_j^* \| K_{CHN}) \| T_2)$ and $\lambda = y_j^{new} \oplus h(T_2 \| S_2^* \| h(id_j^* \| K_{CHN}))$, calculating the session key $K_{SH}$, calculating the identity verification parameter $\Delta = h(x_j^{new} \| y_j^{new} \| K_{SH} \| T_2)$, and adding $\{\mu, \lambda, \Delta, S_3, T_2, id_p\}$ into the information $EMS_3$, where $\mu$ is configured to encrypt the $x_j^{new}$, and $\lambda$ is configured to encrypt the $y_j^{new}$;

wherein the S4.6 specifically comprises:

when the time stamp $T_2$ is judged to be valid, calculating $S_4^* = b_j \cdot S_3$ through the function of the elliptic curve $E_p$ by the sensor node SN of the healthcare monitoring device, calculating updated $x_j^{new*} = \mu \oplus h(S_3 \| MH_j \| T_2)$ and updated $y_j^{new*} = \lambda \oplus h(T_2 \| S_2 \| MH_j)$, calculating a session key $K_{SH}^*$ based on content of the information $EMS_4$, and calculating the identity comparison verification parameter $\Delta^* = h(x_j^{new*} \| y_j^{new*} \| K_{SH}^* \| T_2)$;

wherein identity verification parameter comparison is comparing an identity verification parameter carried by information EMS sent from a previous stage with an identity comparison verification parameter obtained by each of the sensor node SN of the health monitoring device and the cloud server HN based on existing parameters, the identity verification parameter carried by information EMS sent from a previous stage is one of $Vid_j=h(id_j\|x_j\|y_j\|S_1\|S_2\|h(S_2, MH_j)\|T_j\|T_1)$ of the sensor node SN of the healthcare monitoring device and $\Delta=h(x_j^{new}\|y_j^{new}\|K_{SH}\|T_2)$ of the cloud server HN, the identity comparison verification parameter obtained by each of the sensor node SN of the health monitoring device and the cloud server HN based on existing parameters is one of $Vid_j^*=h(id_j^*\|x_j\|y_j\|S_1\|S_2^*\|h(S_2^*, h(id_j^*, K_{HN}))\|T_j\|T_1)$ of the cloud server HN and $\Delta^*=h(x_j^{new*}\|y_j^{new*}\|K_{SH}^*\|T_2)$ of the sensor node SN of the healthcare monitoring device.

7. The privacy protection authentication device as claimed in claim 4, wherein the updating the registration information specifically comprises:

after the device and the cloud server HN complete the mutual authentication and key verification, acquiring, by the healthcare monitoring device, parameters from the information $EMS_4$ sent by the cloud server HN, calculating $x_j^{new*}=\mu\oplus h(S_3\|MH_j\|T_2)$ and $y_j^{new*}=\lambda\oplus h(T_2\|S_2\|MH_j)$, using $x_j^{new*}$ to replace $x_j$ of the registration information in the memory, and using $y_j^{new*}$ to replace $y_j$ of the registration information in the memory.

8. The privacy protection authentication device as claimed in claim 1, wherein the updating the registration information specifically comprises:

after the device and the cloud server HN complete mutual authentication and key verification, acquiring, by the device, parameters from information $EMS_4$ sent by the cloud server HN, calculating $x_j^{new*}=\mu\oplus h(S_3\|MH_j\|T_2)$ and $y_j^{new*}=\Delta\oplus h(T_2\|S_2\|MH_j)$, using $x_j^{new*}$ to replace $x_j$ of the registration information in the memory, and using $y_j^{new*}$ to replace $y_j$ of the registration information in the memory.

* * * * *